Figures 1, 2:
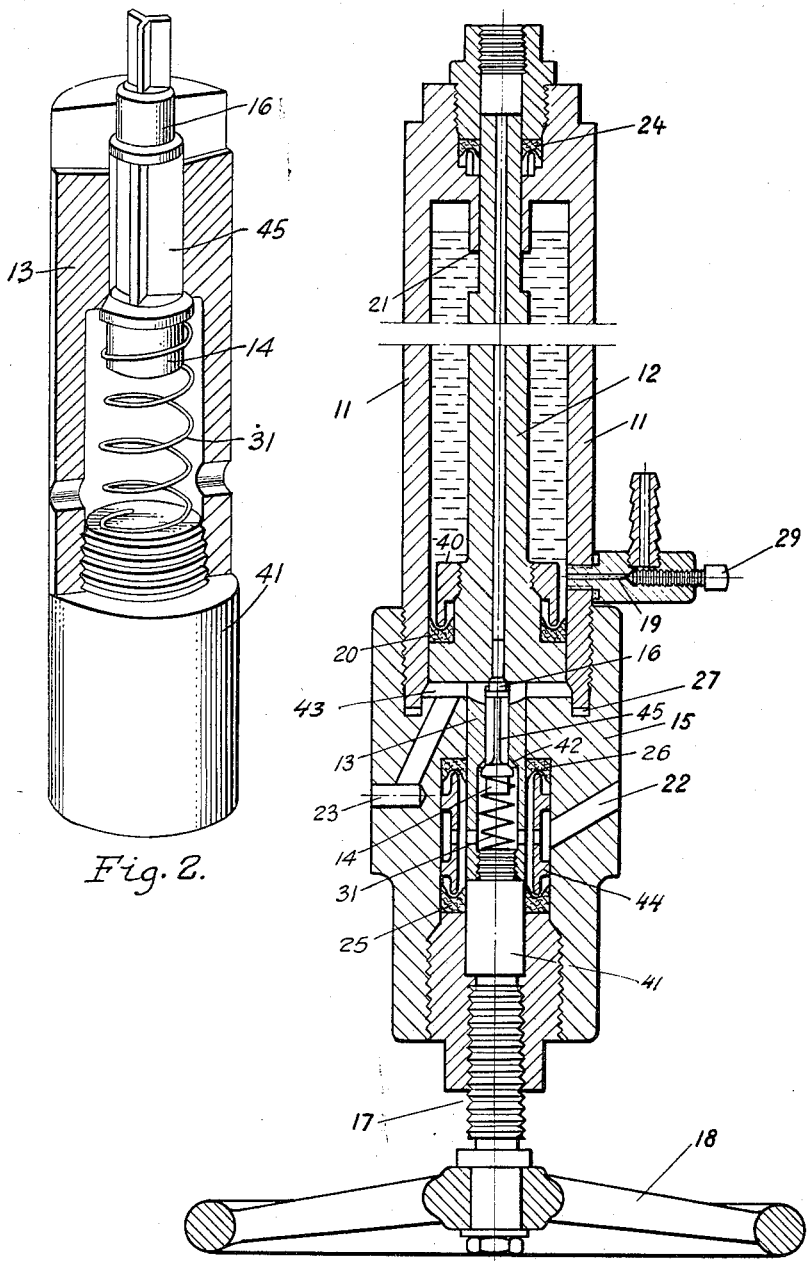

Dec. 15, 1953  H. G. A. AKERLIND  2,662,349
REDUCTION VALVE FOR PRESSURE LIQUIDS
Filed Aug. 7, 1947

INVENTOR.
Hilmer Gustav Adolf Akerlind
BY Ray J. Ernst
ATTORNEY

Patented Dec. 15, 1953

2,662,349

UNITED STATES PATENT OFFICE 2,662,349

REDUCTION VALVE FOR PRESSURE LIQUIDS

Hilmer Gustav Adolf Åkerlind, Stora Essingen, Sweden, assignor to Telefonaktiebolaget L M Ericsson, Stockholm, Sweden, a company of Sweden Application August 7, 1947, Serial No. 767,030

6 Claims. (Cl. 50—34)

This invention relates to a reduction valve for pressure liquids having a regulating piston movable under the influence of the liquid pressure, the piston actuating a valve member for regulating the liquid flow.

Known valves of this kind, if they are not complicated and costly, have the drawback of not operating satisfactory due to unreliable pressure regulation and insensitivity to pressure variations. The unreliability is caused mainly by foreign matter in the pressure liquid which prevents complete closing of the valve, resulting in increased pressure. The insensitivity is caused by high frictional resistances in the packings and the comparatively feeble regulating powers available by the use of coil springs.

It is an object of the present invention to provide a simple and inexpensive valve by which said inconveniences are avoided.

According to the invention, in a reduction valve of the type specified the regulating piston is resiliently urged against the liquid pressure by an air cushion formed in a container on the opposite side of the piston.

The invention will now be described with reference to the accompanying drawings in which, Figure 1 is a vertical view mainly in section of a reduction valve embodying the invention; and Figure 2 is a perspective view partly in section showing the valve cage and valve element construction.

The body of the reduction valve is formed by an air container 11 and a valve box 15 which by means of threaded portions are rigidly connected with each other. A packing 27 is fitted to prevent the pressure liquid from leaking through the threaded connection. In the air container 11 is a regulating piston 12, which is provided with a packing 20 and a ring 40 therefor. The box 15 has a valve cage 13 provided with an inlet valve seat 42, screw threaded to a plug 41, and a valve member formed of valve portions or cones 14 and 16 rigidly connected to stem 45. A spring 31 tends to keep the valve cone or element 14 against the seat 42. The valve cone or element 16 has its seat in the lower portion of a channel running centrally through the regulating piston 12. The stroke of the piston 12 is limited downwardly by the valve seat member 13 and upwardly by a stop face 21 in the air container.

Pressure liquid enters through a channel 22 and, assuming that the inlet valve portion or cone 14 is off its seat 42, passes the valve cone 14 and flows through the central bore of the valve cage 13 and a pressure chamber 43 to an outlet channel 23. The packing between the box 15 and the valve cage 13 is in the form of two packing rings 25 and 26 held in place by a ring 44.

Before the reduction valve can be used it must be charged, and, to achieve this, air up to a certain pressure, for example 5 atmospheres, is introduced into the air container 11 through the inlet 19, which latter is thereupon closed by a screw 29. The piston 12 will now occupy its lower extreme position. Pressure is now applied by the handwheel 18 to displace piston 12 to its upper extreme position, that is in contact with the stop 21. If now pressure liquid at a pressure of for example 100 atmospheres is introduced through the channel 22 and the exhaust passage 23 is closed, the pressure liquid at first fills the chamber 43 between the regulating piston and the valve box 15, thereafter entering the air container over the periphery of the regulating piston 12 past the packing 20 and entering the air container until the pressure of the confined air corresponds to the pressure of the liquid.

The air in the container 11 being compressed forms an air cushion in the upper part of the container above the stop 21. The valve is now charged and ready for use.

By varying the setting of the valve cage 13 by means of the handwheel 18, the pressure to which the liquid is to be reduced may be adjusted between a certain minimum value and the maximum determined by the liquid pressure. As the setting is moved upward, the valve cage 13 moves the piston 12 with it, and thus the biasing pressure of the confined liquid and air in container 11 acting against piston 12 is increased, so that the pressure permitted in the liquid pressure chamber 43 is increased. On the other hand, as the setting is moved downward, the pressure of the confined liquid and air in container 11 holds the piston 12 in contact and moves it down with the cage 13, thus reducing the pressure of the confined liquid and air and thereby reducing the pressure permitted in the liquid pressure chamber 43. If pressure liquid, for example of 50 atmospheres, is to be conveyed to a certain device through the passage 23, the following operations are carried out:

The wheel 18 is turned so that the valve cage 13 occupies its lower position. Pressure liquid is supplied to the inlet 22 at a pressure exceeding the final pressure required. The wheel 18 is turned to move the valve cage 13 upwardly and displace the inlet valve portion or cone 14 from its seat until the desired pressure is obtained at the exhaust passage 23, whereupon the piston is maintained in that position. The valve thereby causes reduction of the pressure, for example from 100 to 50 atm. If the pressure under the regulating piston 12, that is in the pressure chamber 43, should increase the regulating piston is automatically lifted. The valve cone 14 is also lifted and thereby enters its seat and the flow ceases. As soon as the liquid pressure falls in the chamber 43, the piston 12 moves downwardly, whereby the valve cone 14 is depressed and further liquid can enter the chamber 43. The air confined in the air container 11 will thus operate in the sense of a coil spring which, acting upon the regulating piston, tends to press the valve cone 14 out of its seat 42.

Should dirt in the pressure liquid stick between the valve cone 14 and its seat 42, the liquid passing through is not completely checked and the regulating piston 12 will continue its upward movement whilst the liquid pressure increases. The safety valve cone 16 is then operated. The valve cone 16, which hitherto had been positioned against its seat in the piston 12, is prevented from following the further upward movement of the piston after the valve cone 14 abuts against the seat 42, so that the channel in the regulating piston 12 formerly closed by the valve cone 16 is now opened and the liquid may flow therethrough.

Since the effective cross-sectional area available for downward fluid pressure on the piston 12 is somewhat smaller than that of the pressure chamber 43, when the piston 12 is balanced the downward fluid pressure per unit area in the container 11 will be higher than the upward pressure per unit area against the piston in the pressure chamber. The packing 20 is therefore under a certain downward pressure which produces the required sealing effect. The pressure difference and the movement of the piston 12 required to open and close the valve cone 14 is small, thus producing a comparatively light packing friction. The friction obtaining at an upper packing 24 does not effect the sensitivity on account of its small dimensions.

The air confined in the container 11 used in the proposed construction will not enter into contact with the piston packings because of the confined liquid, so that the risk of air leakage is small.

I claim:

1. A reduction valve for liquid under pressure comprising a body having a pressure liquid passage extending therethrough with an inlet and an outlet, a valve cage in said passage provided with an inlet valve seat, a valve element in said cage having an inlet valve portion movable onto and off said inlet valve seat to control the flow of liquid through said passage, a pressure chamber forming part of said passage between the inlet valve and said outlet, a piston container, a piston slidable in said container to expand or contract the volume thereof and having its outer face forming part of the wall of said pressure chamber, a confined body of liquid and gas under pressure in said container, means preventing the escape of said liquid or gas around said piston into said pressure chamber, means for selectively setting an outward limit position for said piston in order to predetermine the pressure in said pressure chamber beyond which the piston will be moved inwardly against the pressure of the body of liquid and gas in said container, said valve element abutting against said piston and thereby having its inlet valve portion held off its seat when the piston is in its outward limited position, and means tending to return said inlet valve portion to its seat when said piston is moved inwardly.

2. A reduction valve according to claim 1, in which a packing ring is provided between the piston and the container wall, which packing ring permits pressure liquid to be forced initially from the pressure chamber into the piston container in order to charge said piston container, and wherein the available cross-section for downward pressure on the container side of the piston is smaller than the available cross-section for upward pressure on the pressure chamber side of the piston so that when the container has been charged and the device is in operation the downward pressure per unit area in the container is greater than the upward pressure per unit area in the pressure chamber, and said downward pressure tends to press said packing ring into close sealing contact.

3. A reduction valve according to claim 1, in which a bore extends centrally through said piston to atmosphere and is provided with a safety valve seat at the outer surface of said piston, said valve element has a safety valve portion normally resting on the valve seat on said piston, the means which tends to return said inlet valve portion to its seat tends also to hold said safety valve portion on its seat, and said valve element is so limited by said valve cage in its movement in the direction toward said piston that said safety valve portion is unseated in order to by-pass pressure liquid into said bore when the piston moves inward after the inlet valve portion reaches its seat if the latter portion fails to control the flow of the pressure liquid and the pressure in the pressure chamber exceeds a predetermined amount.

4. A reduction valve for liquid under pressure comprising a body having a pressure liquid passage extending therethrough with an inlet and an outlet, a valve cage in said passage provided with an inlet valve seat, a valve element in said cage having an inlet valve portion movable onto and off said inlet valve seat to control the flow of liquid through said passage, a pressure chamber forming part of said passage between the inlet valve and said outlet, a piston container, a piston slidable in said container to expand or contract the volume thereof and having its outer face forming part of the wall of said pressure chamber and normally abutting against said valve cage, a confined body of liquid and gas under pressure in said container, means preventing the escape of said liquid or gas around said piston into said pressure chamber, means for shifting the position of said valve cage for selectively setting an outward limit position for said piston in order to predetermine the pressure in said pressure chamber beyond which the piston will be moved inwardly against the pressure of the body of liquid and gas in said container, said valve element abutting against said piston and thereby having its inlet valve portion held off its seat when the piston is in its outward limit position, and means tending to return said inlet valve portion to its seat when said piston is moved inwardly.

5. A reduction valve according to claim 4, in which said valve element comprises a stem disposed within said valve cage and having the inlet valve portion at one end and the safety valve portion at its other end, and the distance on said valve element from the inlet valve portion to the safety valve portion is greater than the distance on said valve cage from the point of abutment against said piston to the inlet valve seat.

6. A reduction valve for liquid under pressure comprising a body having a pressure liquid passage extending therethrough provided with an inlet and an outlet, a valve cage in said passage provided with a bore for the passage of the pressure liquid having an inlet valve seat, a valve element having a stem movably disposed in the bore of said valve cage and provided with an inlet valve portion at one end and a safety valve portion at the other end, a pressure chamber forming part of said passage between the inlet valve and said outlet, a piston container, a piston slidable in said container to expand or contract the volume thereof and having its outer face forming part of the wall of said pressure chamber and abutting against said valve cage, a confined body of liquid and gas under pressure in said container, means preventing the escape of said liquid or gas around said piston into said pressure chamber, means for shifting the position of said valve cage for selectively setting an outward limit position for said piston in order to predetermine the pressure in said pressure chamber beyond which the piston will be moved inwardly against the pressure of the body of liquid and gas in said container, said piston being provided with a central bore having a safety valve seat and extending through to atmosphere, the bore in said piston being in alinement with the bore in said valve cage, said valve element abutting against said piston and thereby having its inlet valve portion held off its seat and its safety valve portion held onto its seat when the piston is in its outward limit position, means associated with the valve cage tending to return said inlet valve portion to its seat and to hold said safety valve portion on its seat, the distance on said valve element from the inlet valve portion to the safety valve portion being greater than the distance on said valve cage from the point of abutment against said piston to the inlet valve seat whereby as said piston moves inward by reason of pressure in the pressure chamber the safety valve portion will remain on its seat until the inlet valve portion reaches its seat whereupon if excess pressure develops in the pressure chamber the piston will move away from and unseat the safety valve portion thus by-passing liquid from the pressure chamber into the bore of said piston.

HILMER GUSTAV ADOLF ÅKERLIND.

References Cited in the file of this patent

UNITED STATES PATENTS

| Number | Name | Date |
| --- | --- | --- |
| 129,015 | Fay | July 16, 1872 |
| 237,624 | Soule | Feb. 8, 1881 |
| 237,625 | Soule | Feb. 8, 1881 |
| 251,726 | Mueller | Jan. 3, 1882 |
| 323,039 | Hodges | July 28, 1885 |
| 584,766 | Barker | June 22, 1897 |
| 868,219 | Pietzuch | Oct. 15, 1907 |
| 1,588,107 | Hains | June 8, 1926 |
| 1,593,648 | Berger | July 27, 1926 |
| 2,047,101 | Grove | July 7, 1936 |
| 2,261,364 | Grove | Nov. 4, 1941 |
| 2,313,564 | Manly | Mar. 9, 1943 |
| 2,357,318 | Donaldson | Sept. 5, 1944 |